UNITED STATES PATENT OFFICE.

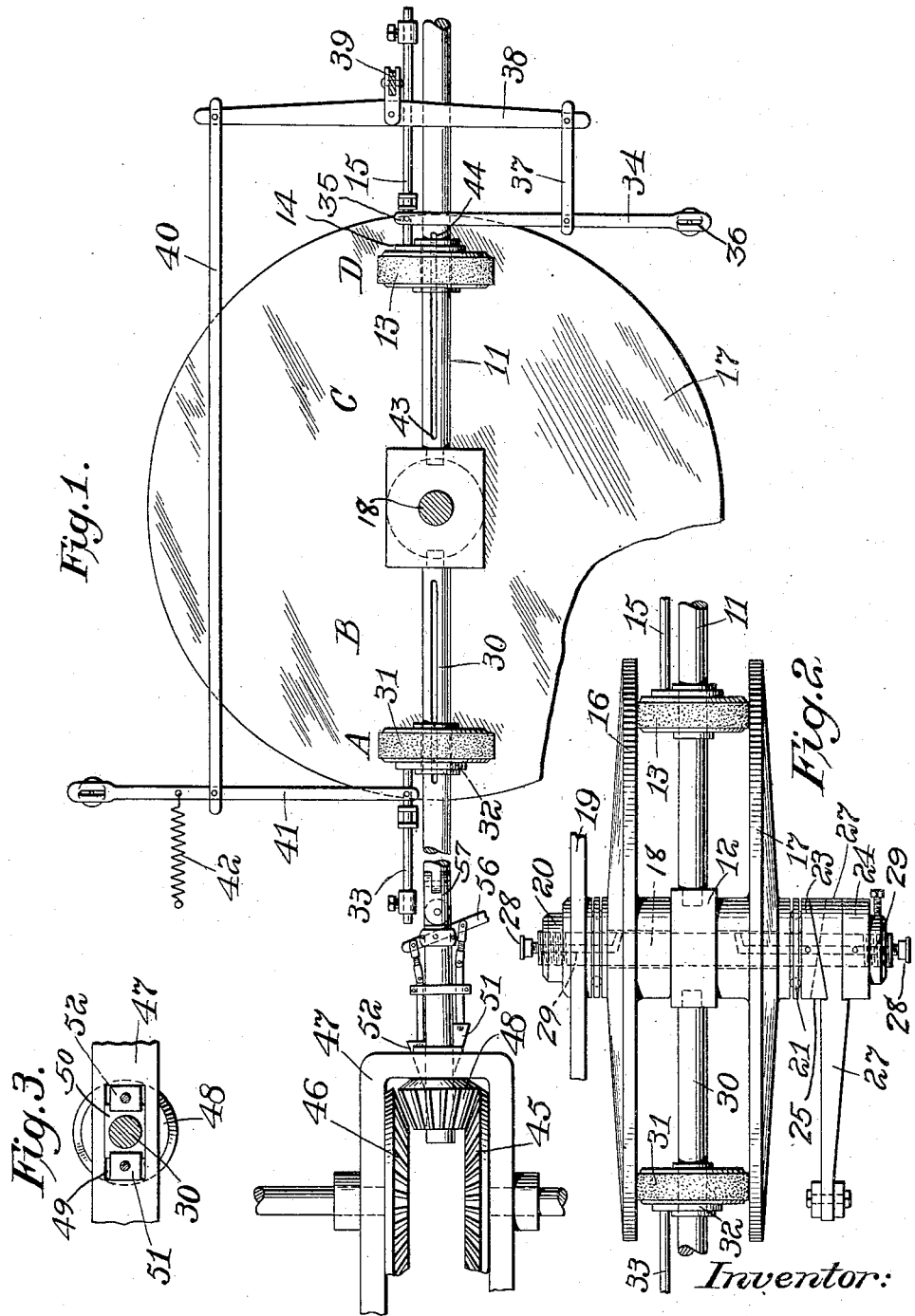

OTTO J. SENUM, OF KARLUK, SASKATCHEWAN, CANADA.

TRANSMISSION-GEARING.

1,206,147.   Specification of Letters Patent.   Patented Nov. 28, 1916.

Application filed March 9, 1916. Serial No. 83,079.

*To all whom it may concern:*

Be it known that I, OTTO J. SENUM, a citizen of the United States, residing at Karluk, Saskatchewan, Canada, have invented a new and useful Improvement in Transmission-Gearing, of which the following is a specification.

This invention relates to transmission gearing such as is used in automobiles and its object is to provide a transmission that will give an infinite number of speed ratios and also one that is very rapidly reversed.

With these objects in view, the invention consists in the arrangement, combination and construction of parts hereinafter described and particularly pointed out in the claims, it being understood that I do not intend to limit myself to the details of construction.

The invention is illustrated in the accompanying drawings, in which:

Figure 1 is a partly diagrammatic plan view of my transmission. Fig. 2 is a side elevation of my main or horizontal friction gears, and Fig. 3 is a detail of my reverse mechanism.

In the drawings the numeral 11 indicates the drive shaft from the engine journaled in a box 12. On this shaft is a friction wheel 13, which may be paper faced if desired, rotatable with shaft 11 but slidable thereon by means of collar 14 and operating rod 15 attached thereto. This wheel 13 operates upon and lies between two similar oppositely arranged friction disks 16 and 17. These disks are rotatably journaled upon a vertical shaft or axle 18 suitably and fixedly secured to the automobile frame 19. This axle 18 carries the box 12 intermediate thereof and between the two disks. Above the automobile frame 19 the axle is provided with a nut 20 for adjusting it vertically. Between the disk 16 and the frame, ball races 20 are provided. At its lower end, the axle is provided with ball races either similar to the races 20 or they may be in a cage 21 as shown.

23 and 24 represent collars on the axle having laterally toothed adjacent faces as at 25. Between these collars a clutch member 27 is provided having faces complementary to the toothed faces of the collars. While I have shown teeth on both faces of the clutch and both collars, I may only use them on one face and one collar.

28 represents oil cups on the extremities of the axle connected to oil channels 29 for conducting oil to the bearing surfaces of the friction disks.

In the box 12 another shaft 30 is journaled and which carries a friction wheel 31 slidable upon said shaft by means of a collar 32 operated by a rod 33, all as the wheel 13 on the engine shaft.

A lever 34 is secured to the rod 15 at 35 which lever is pivoted at its other end by means of another slotted connection 36. Intermediate of its length, a link 37 connects it to an equalizing bar 38 which in turn is pivotally secured to an operating handle or lever 39. At its other end, this bar 38 is connected by a link 40 to a lever 41 operating upon the rod 33 and wheel 31, similar in all respects to the lever 34, with the addition of a spring 42 operating thereupon as shown.

43 and 44 indicate stops for limiting the movement of the wheels 13 and 31.

The shaft 30 continues on to the differential of the automobile which includes bevel gears 45 and 46 on the axle of the car. These gears are held adjacent to each other within a casing 47 which also has a beveled pinion 48 adapted to mesh with either gear 45 or 46 and which is carried by the shaft 30. The shaft 30 passes through a guide 49 in the casing 47 and is journaled in a block 50 slidable within the guideway 49 between each side of the block and the end of the guide, wedges 51 and 52 are provided which wedges are alternately inserted and withdrawn from such position by means of operating rods 53 and 54 attached to a controlling lever 56. A turnbuckle may be inserted in these connections to take up wear. A universal joint 57, it is to be understood, will be provided between the friction disks and the differential.

The operation of the device is as follows: With the engine driving it will be seen that the wheel 13 will revolve, rotating the disks 16 and 17 in opposite directions, which in turn will revolve the wheel 31. This will turn the shaft 30 and the automobile will be driven. Now suppose the driver desires to go from "direct gear" (shown in Fig. 2) to low. His first act is to move the clutch lever which will rotate the clutch 27 so that the collars 23 and 24 may come closer together which will permit the lower disk 17 to drop so that pressure of the two disks upon the wheel 13 will be relieved. This will enable the wheel 13 to be moved to a new ratio with the disks 16 and 17. The desired relative extreme positions of the wheels 31 and 13 will be as follows: A and D, A and C, or B and D. Now the spring 42 normally maintains the wheel 31 in the position A. Therefore, if AC is desired the lever 39 is moved to the left (Fig. 1). As further movement of the lever 41 is impossible, the wheel 31 being at its outward limit, the bar 38 has all the effect of being pivoted at the point where the link 40 meets it so that with this as a pivot it moves the lever 34 and its wheel 13 inwardly to the point C. Return of the handle 39 will of course return the wheel 13 to D. Now suppose BD is desired. With the wheel 13 at its outward limit, the bar has the effect of being pivoted at its lower end (Fig. 1) so that movement of the handle 39 to the right will move the link 40 and through it the lever 41, against the spring pressure, and the wheel 31 to the position B. Intermediate combinations of positions may be secured in a similar manner, of course.

When it is desired to reverse the driver, it is only necessary for the driver to operate the lever 56 when the clutch is out to retract the wedge 52 and insert the wedge 51 between the block 50 and the side of the guide 49 whereupon the pinion 48 changes from meshing with the forward driving gear 45 to mesh with the reverse driving gear 46.

What I claim is:

1. A device of the class described including friction disks, two friction wheels coacting therewith, a single controlling handle, and means for selectively changing the position of either of said wheels operated by said handle comprising levers operating to move said wheels, an equalizer pivoted to said controlling handle, and connections between the ends of said equalizer and said levers.

2. A device of the class described including friction disks, two friction wheels coacting therewith, a single controlling handle, and means for selectively changing the position of either of said wheels operated by said handle comprising levers operating to move said wheels, a spring acting upon one of said levers, an equalizer pivoted to said controlling handle, and connections between the ends of said equalizer and said levers.

3. A device of the class described including friction disks, two friction wheels coacting therewith, a single controlling handle, and means for selectively changing the position of either of said wheels operated by said handle comprising levers operating to move said wheels, a spring acting upon one of said levers, stops for limiting the outward movement of said wheels, an equalizer pivoted to said controlling handle, and connections between the ends of said equalizer and said levers.

OTTO J. SENUM.